UNITED STATES PATENT OFFICE.

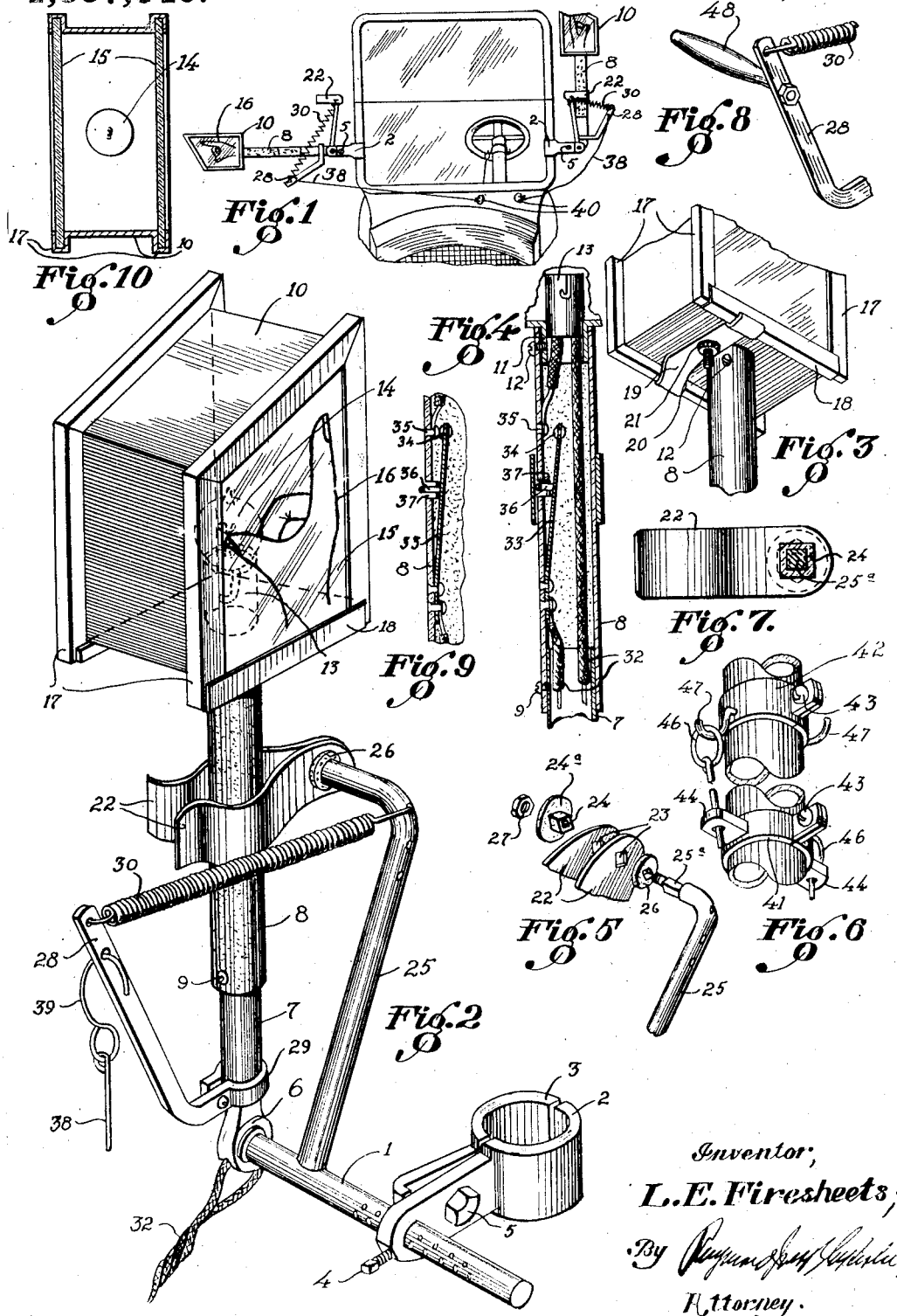

LAWRENCE E. FIRESHEETS, OF RIVERSIDE, CALIFORNIA.

VEHICLE DIRECTION-SIGNAL.

1,357,040.     Specification of Letters Patent.     Patented Oct. 26, 1920.

Application filed July 24, 1919. Serial No. 313,052.

*To all whom it may concern:*

Be it known that I, LAWRENCE E. FIRE-SHEETS, a citizen of the United States, residing at Riverside, in the county of Riverside and State of California, have invented new and useful Improvements in Vehicle Direction-Signals, of which the following is a specification.

The present invention relates to a direction indicating signal attachment for vehicles, and has for its object to provide a device of this character which embodies novel features of construction, whereby it can be readily operated and will enable the driver of a vehicle to signal in an effective manner that he is about to make a turn, thereby avoiding a possible collision or accident.

Further objects of the invention are to provide a device of this character which can be readily applied to any vehicle, which is comparatively simple and inexpensive in its construction, which can be operated without difficulty by the driver of the vehicle, and which provides a most effective signal.

With these and other objects in view the invention consists in certain combinations and arrangements of the parts as will more fully appear as the description proceeds, the novel features thereof being pointed out in the appended claims.

For a full understanding of the invention reference is to be had to the following description and accompanying drawing, in which:

Figure 1 is a front view of an automobile having direction indicators which are constructed in accordance with the invention attached to opposite sides of the windshield, one of the direction indicators being shown as swung downwardly into operative position while the other direction indicator is swung upwardly into inoperative position, portions being broken away;

Fig. 2 is an enlarged detached perspective view of one of the direction indicators;

Fig. 3 is a perspective view of the bottom or inner end of the lamp box, showing the clip for retaining the glass plate in position;

Fig. 4 is a longitudinal sectional view through the swinging arm, showing the arrangement of the electric switch therein;

Fig. 5 is a detail view of the spring clip and the supporting means upon which the same is mounted, the parts being shown as separated;

Fig. 6 is a detail view of a fragmentary portion of the steering wheel post, showing the terminals of the cables which are utilized for operating the direction indicators;

Fig. 7 is a side elevation of the spring clip which engages the swinging arm when the latter is in an upright position, the bushing and polygonal stem of the bracket support for the spring clip being shown in section;

Fig. 8 is a detail view showing a slight modification in which a handle is provided for manually operating the direction indicators without the use of cables.

Fig. 9 is a fragmentary view similar to Fig. 4 but showing the switch blade in closed position.

Fig. 10 is a sectional view of the signal box.

Corresponding and like parts are referred to in the following description and indicated in all the views of the drawing by like reference characters.

Specifically describing the present embodiment of the invention, the numeral 1 designates a rod which forms a part of the supporting bracket and is substantially horizontally disposed when in operative position. This rod extends longitudinally of the vehicle upon which the direction indicator is mounted, and is provided with a pair of complemental clamping jaws 2 and 3 which are adapted to grip some upright portion of the vehicle such as the frame of the windshield. The jaw 2 is formed with an extension which is perforated to receive the rod 1 and is rigidly clamped in position thereon in some suitable manner as by means of the set screw 4. A clamping bolt 5 connects the two jaws 2 and 3 and provides a means for bringing the jaws into a firm engagement with the windshield frame or other upright portion of the vehicle. The end of the rod 1 has a swinging arm pivotally mounted thereon at 6, said arm having a tubular formation and being shown as composed of an inner metal section 7 and an outer section 8 which is formed of some suitable insulating material such as fiber. A fastening member such as the screw 9 rigidly connects the two sections 7 and 8 of the swinging arm, and a box 10 is carried by the outer end of the swinging arm.

The base of the box 10 is formed with a neck 11 which fits within the outer end of the tubular arm and is clamped in position by a suitable fastening member such as the screw 12. A socket 13 is fitted within the box and provided with an incandescent electric light 14. Transparent plates 15 of glass or other suitable material are applied to the box 10 at opposite sides thereof and may have indicating characters such as the hands 16 printed or painted thereon. It is also contemplated that these glass plates 15 may be of different colors. For instance, the rear plate may be red and the front plate green, thereby enabling an observer to tell instantly in which direction the vehicle is moving, as well as to which side a turn is about to be made. These glass plates 15 are removably inserted in channel guides 17 at the sides and outer end of the box 10. The plates are thus slidable in and out of position, and after being properly applied to the box retaining strips 18 are fitted over the ends of the plates and a locking bar 19, such as that indicated by Fig. 3, placed in position. This locking bar may be resilient and may be of any conventional construction, and in the present instance it is shown as fitted upon a threaded stem 20 and clamped in position by tightening the nut 21.

When the swinging arm is moved upwardly into a vertical position, as indicated by Fig. 2, it is engaged by the two opposed jaws of the spring clip 22. The outer ends of the jaws are flared in the conventional manner so as to receive the swinging arm and guide it between the jaws when it is moved upwardly, while the inner ends of the spring clips are formed with polygonal openings 23 which receive a polygonal bushing 24, said bushing being fitted upon the polygonal laterally extended upper end 25ª of a bracket arm 25. This bracket arm 25 is rigid with the rod 1 and extends upwardly therefrom. The bushing 24 insulates the spring clip 22 from the bracket arm and is formed with a flanged end 24ª which engages one side of the spring clip, an insulating washer 26 being provided for engagement with the opposite side of the spring clip. A nut 27 normally holds the parts in an assembled position, although it will be obvious that by assembling the parts in the desired manner the spring clip can be caused to project from either side of the bracket arm, depending upon whether the particular unit being assembled is to be applied to the right-hand side or to the left-hand side of the vehicle.

An operating lever 28 projects laterally from the swinging arm, being provided at its inner end with suitable fastening means such as the clamping collar 29 by means of which it is adjustably secured to the swinging arm, and can be arranged to project from either side of the swinging arm, depending upon whether the particular unit being assembled is to be used on the right-hand side or the left-hand side of the vehicle. A suitable tension spring 30 connects the operating lever 28 to the bracket arm 25 and normally tends to swing the signal arm upwardly into an upright position and hold it in engagement with the spring clip 22.

The electric wires 32 for the light 14 extend through the tubular signal arm and enter the same at the pivot end thereof. A normally open electric switch is interposed in the light circuit and arranged within the insulated section 8 of the signal arm. This switch includes a resilient blade 33 having a movable contact 34 at the free end thereof which is adapted to engage a fixed contact 35. A finger 36 projects laterally from the resilient blade 33 and is arranged to pass through an opening 37 formed in one side of the insulated tubular section 8 of the signal arm. When the signal arm is in an upright position, as indicated by Figs. 2 and 4, the finger 36 is engaged by one of the jaws of the spring clip 22 and the resilient switch blade 33 flexed inwardly to swing the movable contact 34 away from the fixed contact 35 and hold the switch in an open position. The direction indicator is then inoperative and the light 14 is not illuminated. However, if the signal arm is swung downwardly into a substantially horizontal and operative position, the resiliency of the switch blade 33 will bring the movable contact 34 into engagement with the fixed contact 35 as soon as the arm is disengaged from the spring clip 22, the circuit will then be closed and the light 14 illuminated. This flashing of the light will attract attention to the signal and the light will remain illuminated as long as the signal arm is swung downwardly into operative position. However, as soon as the signal arm is swung upwardly into inoperative position and brought into engagement with the spring clip 22, the resilient switch blade 33 will be flexed inwardly to open the electric circuit and extinguish the electric light. In this connection it will be understood that as soon as the signal arm is released it will be automatically returned to inoperative position by the action of the spring 30.

Any suitable means may be provided for operating the direction signal. As indicated by Figs. 1 and 2 cables 38 are connected by suitable means such as the hooks 39 to the operating levers 28. These cables pass around suitable guide members 40 and enter the inside of the vehicle, after which they are carried up at the sides of the steering post. A pair of split collars 41 and 42 are applied to the steering post, being clamped in position thereon by the screws 43. The lower collar 41 is provided with ears 44 having guide openings therein through which the cables 38 pass. Rings or finger-pieces 46 are applied to the extremities of the cables 38, and these rings are adapted to be placed in engagement with hook members 47 on the upper collar 42 for the purpose of locking the signal arms in an operative position when such is desirable. Under normal conditions the finger-pieces 46 are disengaged from the hook members 47 and the signal arms permitted to be held in an inoperative position by the spring clips 22. However, when the driver of a vehicle contemplates making a turn, either to the right or to the left, he will grasp the finger-piece 46 of the corresponding signal arm and pull upon the same to swing the signal arm downwardly into operative position. As previously explained, the light will be flashed as soon as the signal arm is disengaged from the spring clip 22, and the signal arm may either be caused to vibrate up and down by successive pulls upon the finger-piece, or temporarily locked in a lowered position by placing the ring 46 in engagement with the hook member 47 of the upper collar 42. After the turn has been made the ring 46 can be disengaged from the hook member 47 whereupon the signal arm will be returned to its original position by the action of the spring 30. Instead of the cables 38, suitable handles 48 may be applied directly to the operating levers 28, as indicated by Fig. 8. These handles 48 can be grasped by the operator when it is desired to swing either of the signal arms downwardly into operative position.

The construction of the parts is such that they can be assembled to provide either a right-hand or a left-hand direction indicator. This avoids the necessity of providing right and left-hand parts and consequently reduces the cost of manufacture. It will be obvious that the clamping jaws 2 and 3 can be rotated upon the rod 1 and caused to project from either side thereof, depending on whether the device is to be attached to the right-hand side or left-hand side of the vehicle. Similarly the spring clip 22 can be assembled upon the bracket arm 25 in such a manner as to project from either side thereof, and by loosening the screw 12 the neck 11 of the lamp box 10 can be rotated in the outer end of the tubular arm to reverse the position thereof. The provision of a right or left-hand direction indicator unit is thus merely a matter of assembling the different parts in the proper manner.

While I have illustrated and described one particular embodiment of my direction indicator for vehicles, it will be understood that I do not restrict myself to the exact details which have been disclosed, since many modifications and changes can be made therein without departing from the spirit of the invention.

Having thus disclosed my invention, I claim and desire to secure by Letters Patent:

1. A direction signal for vehicles, including a supporting rod, clamping jaws projecting from the supporting rod, a signal arm pivotally mounted upon the supporting rod, signal means carried by the arm, a bracket projecting laterally from the supporting rod, a clip carried by the bracket and arranged to engage the signal arm to hold it in inoperative position, yielding means normally tending to swing the signal arm in engagement with the clip, and means for swinging the signal arm into operative position against the action of the said yielding means.

2. A direction signal for vehicles, including a supporting rod, clamping jaws projecting laterally from the supporting rod, a signal arm pivotally mounted upon the supporting rod, signal means at the swinging end of the arm, a bracket arm projecting laterally from the supporting rod, a clip carried by the bracket for engaging the signal arm to hold it in inoperative position, an operating lever projecting from the signal arm, and a spring connecting the operating lever and bracket and normally tending to swing the signal arm into inoperative position.

3. A direction signal adjustable for attachment to either the right-hand or left-hand side of a vehicle, said signal including a supporting rod, clamping jaws projecting laterally from the supporting rod and rotatable thereon into different positions, a signal arm pivotally mounted upon the supporting rod, signal means carried by the arm, a bracket projecting from the supporting rod, and a spring clip reversibly applied to the bracket and adapted to engage the signal arm to hold it in inoperative position.

4. A direction signal for vehicles, which is adjustable to be applied to either the right or left-hand side of the vehicle, including a rod, clamping jaws projecting laterally from the rod and rotatable thereon into any desired position, a signal arm pivotally mounted upon the rod, signal means carried by the rod, a bracket projecting laterally from the rod, a spring clip applied to the bracket and reversible thereon to project in either direction, said spring clip being arranged to engage the signal arm to hold it in one position, an operating lever reversibly applied to the signal arm, and a spring extending between the operating lever and the bracket.

5. A direction signal for vehicles, said signal being adjustable for attachment to either the right or left-hand side of the vehicle and including a rod, clamping jaws projecting laterally from the rod and rotatable thereon into different positions, a signal arm pivotally mounted upon the rod, a signal member rotatably mounted upon the signal arm so that the position thereof can be reversed, a bracket projecting from the rod, a clip reversibly applied to the bracket and adapted to project upon either side thereof, said clip being adapted to engage the signal arm at one limit of its movement, an operating lever projecting from the signal arm and reversibly applied thereto, and a spring connecting the operating lever to the bracket.

In testimony whereof, I have signed my name to this specification in the presence of two subscribing witnesses.

LAWRENCE E. FIRESHEETS.

Witnesses:
 HUGH S. HILL,
 J. CALVIN BROWN.